US010009551B1

United States Patent
Adcock et al.

(10) Patent No.: US 10,009,551 B1
(45) Date of Patent: Jun. 26, 2018

(54) IMAGE PROCESSING FOR MERGING IMAGES OF A SCENE CAPTURED WITH DIFFERING CAMERA PARAMETERS

(71) Applicant: Amazon Technologies, Inc., Seattle, WA (US)

(72) Inventors: Christopher Mark Stevens Adcock, Cambridge (GB); Ilya Vladimirovich Brailovskiy, Mountain View, CA (US); Ilia Vitsnudel, Even Yehuda (IL); Ian David Skidmore, Malvern (GB); Philip James Taylor, Cambridge (GB)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days. days.

(21) Appl. No.: 15/473,324

(22) Filed: Mar. 29, 2017

(51) Int. Cl.
  *H04N 5/265* (2006.01)
  *H04N 5/247* (2006.01)
  *H04N 5/235* (2006.01)

(52) U.S. Cl.
  CPC .......... *H04N 5/265* (2013.01); *H04N 5/2351* (2013.01); *H04N 5/247* (2013.01)

(58) Field of Classification Search
  CPC ....... H04N 5/265; H04N 5/2352; H04N 5/247
  See application file for complete search history.

(56) References Cited

U.S. PATENT DOCUMENTS

| | | | |
|---|---|---|---|
| 2004/0218830 A1* | 11/2004 | Kang ..................... | G06T 5/50 382/274 |
| 2014/0160260 A1* | 6/2014 | Blanquart ......... | H04N 5/35554 348/68 |
| 2014/0362173 A1* | 12/2014 | Doepke ............. | H04N 5/23238 348/36 |

* cited by examiner

Primary Examiner — Tuan Ho
(74) Attorney, Agent, or Firm — Davis Wright Tremaine LLP

(57) ABSTRACT

An image processor merges images from a plurality of cameras including applying spatially-varying gains over images from individual cameras to obtain a consistent effective where the images are stitched together despite the cameras possibly having different camera exposures. The image processor can adjust the camera exposures to improve stitching results. In addition to gain modification, the image processor can also modify the images for other artifacts, such as veiling glare and make those less visible at the seams of images. The image processor also can take into account constraints on gain changes and optimize camera parameters to minimize stitching artifacts. Using a cost function, the image processor can optimize for constraints on camera exposure that would otherwise result in camera exposure differences that would themselves cause visible artifacts.

23 Claims, 13 Drawing Sheets

IMAGE PROCESSING FOR MERGING IMAGES OF A SCENE CAPTURED WITH DIFFERING CAMERA PARAMETERS

BACKGROUND

There are many applications where it would be useful to capture imagery using multiple cameras and then merge the resulting images. Preferably, the images can be stitched together to provide a larger image. One approach is to require that the camera settings be the same for all cameras and that all the cameras be of the same time. However, this is typically not practical.

BRIEF DESCRIPTION OF THE DRAWINGS

Various techniques will be described with reference to the drawings, in which.

DETAILED DESCRIPTION

Figure 1:
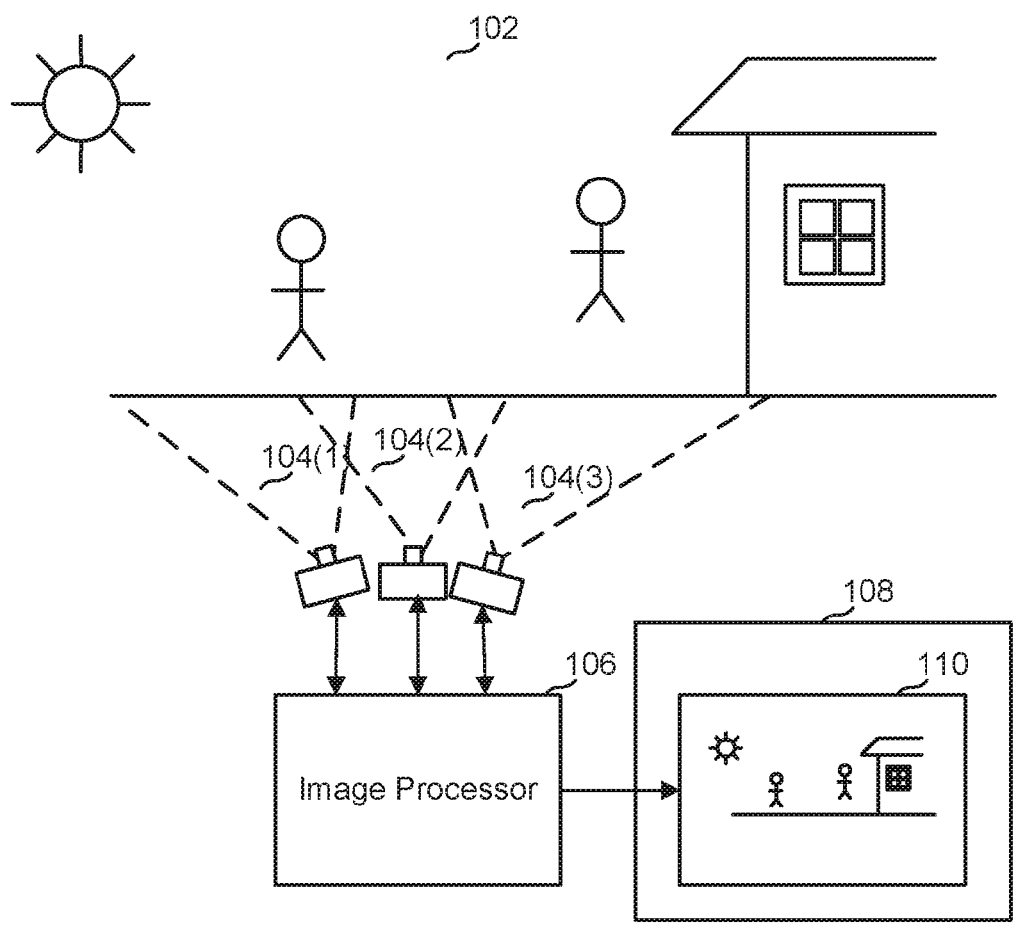
FIG. 1 illustrates an example environment where a plurality of images of a scene are captured and processed to form a stitched image.

In an image processing system as described herein, images are obtained from a plurality of cameras, possibly with different camera settings, such as using different exposure times, sensor analog gain (AG), apertures and the like. In some cases, the camera settings are different for different camera because they are capturing different portions of a scene that might have different lighting conditions, etc. If distinct camera settings are used over a plurality of images and the images are simply stitched together, there will typically be a visible seam where the images are connected. Using techniques described herein, the stitching can provide a more seamless combined image, while still being an accurate image.

As used herein, "camera exposure" refers to a product of exposure time, sensor analog gain (AG) and aperture, but it should be understood that equivalents of the product might be used in appropriate situations. In a digital camera setting, where an image is captured and represented by an array of pixel color values, the camera exposure can determine what pixel color values are present in a captured image for a given amount of light that would fall on those pixels. A dynamic range of a given digital camera or image capture device relates to what light levels correspond to the range of values from the lowest pixel level to the highest pixel level. As used herein, a scene generally refers to the lighting, background, objects, persons, colors, etc. that is physically present in front of a camera or a plurality of cameras. A scene might have some artificial elements added post-capture, but generally a scene is what is observed by an observer and captured by one or more cameras.

There are a number of reasons why individual images might need to be combined to form a combined image. For example, in a security system that needs input images of a scene that have high resolution and a wide field of view, the security system might use multiple cameras to capture individual images and stitch them together to form a combined image of the scene that can be used for computer vision processing. As used herein, stitching of images can represent various image processing methods wherein an input is a plurality of images of a scene, as well as possibly inputs of camera parameters of the cameras that captured the plurality of images, and an output is a stitched image that spans the scene in greater scope that the individual images in the plurality of images.

The processing to generate the stitched image includes processing of the plurality of images to reduce the appearance of discontinuities where images are joined. This processing might include overlaps of images, wherein some portions of a scene are captured in more than one of the input images. The processing might also include addressing artifacts of image capture that are not normally noticed by viewers but are noticeable when images are placed side by side. An example of this is veiling glare.

The plurality of input images might be captured by a different camera for each different input image, but in other cases, one camera might capture more than one input image of the plurality of input images, such as in the case of where a single camera is moved to capture different parts of a scene to create a panoramic image. The different cameras might not necessarily be located in the same place, yet still their individual images may need to be stitched together to form a combined image.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment where a plurality of images of a scene are captured and processed to form a stitched image. As shown there, a scene 102 is captured using three cameras 104(1), 104(2), and 104(3) that have overlapping fields of view. The view from camera 104(1) would be bright because of the sunlight, whereas the view from camera 104(3) would be darker as it is viewing mostly a building. An image processor 106 obtains the individual images from the cameras and processes them to form a combined image, as might be output to a display 108 as combined image 110. Image processor 106 might be part of an integrated system with the cameras, or might be configured to interact with individual cameras that might be cameras not particularly configured for eventual image stitching.

Image processor 106 might send instructions to the cameras 104 to indicate when to take an image, what camera settings to use, and the like. For example, image processor 106 might request images from each camera 104, determine what camera settings each camera 104 should use, then send commands to each camera 104 with their respective settings and request that an image be captured. In other variations, each camera continuously outputs images, perhaps as a video sequence, so image processor 106 does not necessarily have to instruct a camera to capture an image. While the output is shown as being sent to a display, the output of image processor 106 might also be sent to a computer system that does further processing of the stitched image, such as object recognition, storage, broadcasting, printing, etc. The settings and commands sent to cameras 104 might be determined by image processor 106 based on programming of image processor 106 with particular instructions for optimizing each cameras output for the particular requirements of a stitching operation. For example, image processor 106 might set the camera exposure of one camera to be a particular ratio of the camera exposure of another camera.

Figure 2:
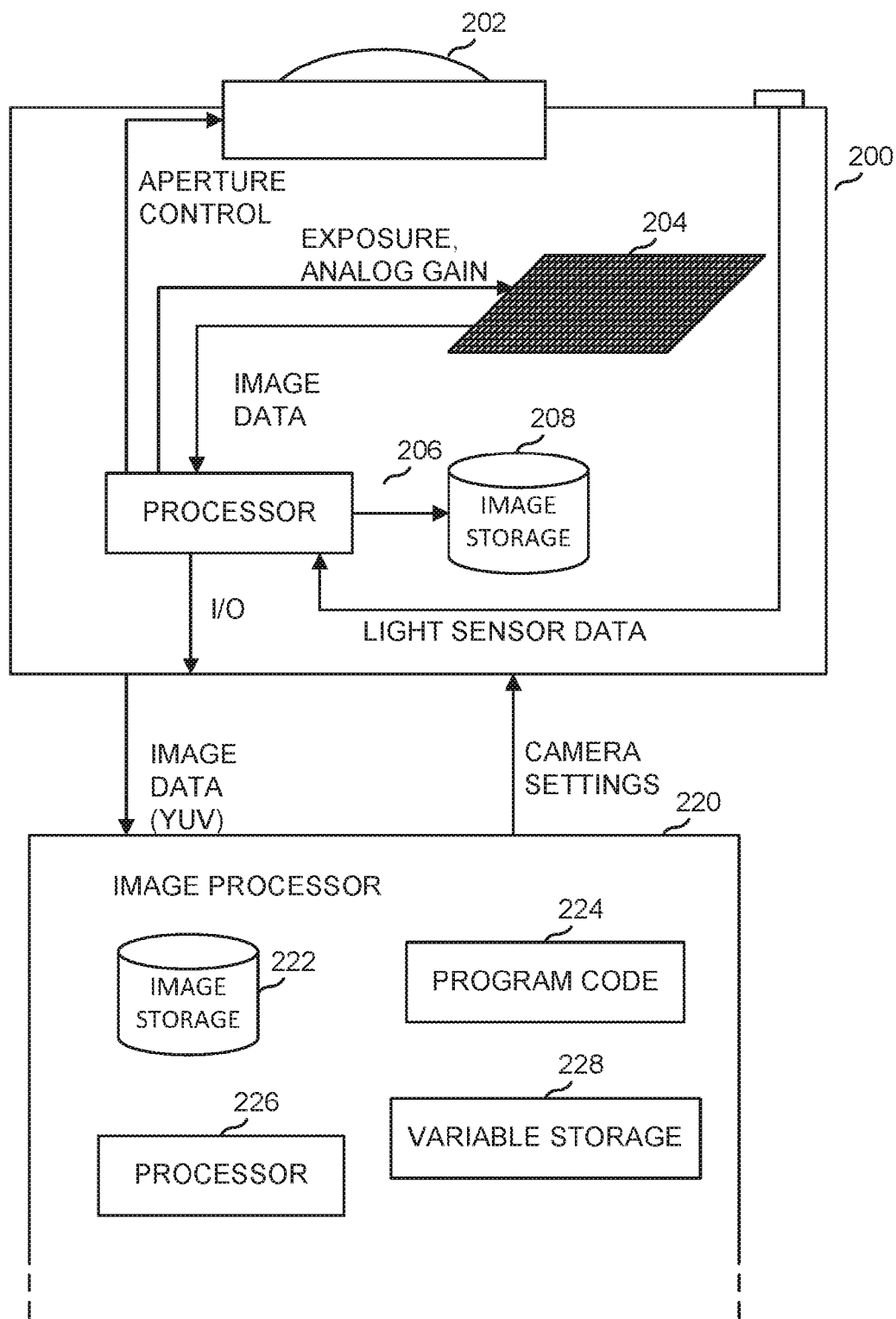
FIG. 2 illustrates one camera and an image processor in greater detail as might be used in an image stitching process.

FIG. 2 illustrates one camera and the image processor in greater detail. As shown, a camera 200 comprises a lens 202, a sensor array 204, a processor 206, and an image storage element 208. Under the control of processor 206, an aperture of lens 202 can be controlled, as well as the reading of sensor array 204 and setting the exposure control (which effects the exposure time, or the amount of time sensor array 204 collects light). Processor 206 can then store images in digital form in image storage element 208, which might be internal memory, a removable memory card, or other element.

Processor 208 also has input/output capability, allowing it to output captured images to an image processor 220 and receive camera control settings from image processor 220. Image processor 220 might comprise image storage 222, for input camera images and/or combined images formed from stitching together input camera images. Image processor 220 might include a computer processor 226, storage for program code 224, and storage for variables 228 used by computer processor 226 in performing various tasks. Those tasks might include image processing that is described herein. Image processor 220 might be part of a larger system that performs more operations than just stitching images. By combining image processing and camera control, image processor 220 might be able to adjust images in an analog fashion, e.g., by instructing camera 200 to alter its exposure time, but might also adjust images in a digital fashion, e.g., by applying a digital gain to an image thus rescaling pixel color values to brighten or darken an image that is already captured.

In the example of FIG. 2, camera 200 has an input to receive camera settings commands, such as an external instruction to set certain camera exposure or other settings. In some variations, such input is not present. In some variations, light sensor data is not available. It may be that an image processor 220 directs the capture of an image, determines what camera exposure should be used based on that captured image, sends those settings to camera 200 and requests that the desired image be captured. In some variations, there is no image storage in camera 200 and images are streamed as they are obtained. Commonly, in a camera such as camera 200, the pixel sensor array data is converted into YUV form and, as explained herein, the data might be inverted back for some processing, then the post-processed image data again converted to YUV form. Where a camera does not do that YUV conversion, it can be done after such processing.

Figure 3:
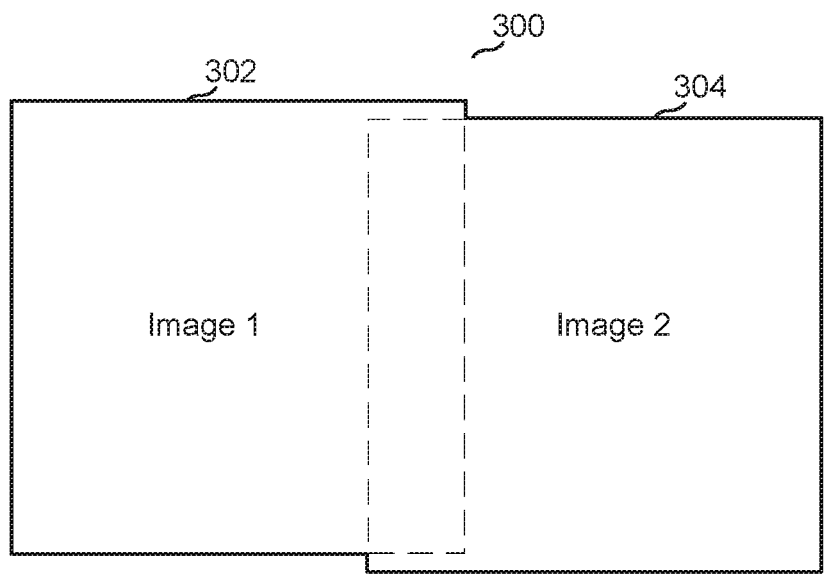
FIG. 3 illustrates a stitched image generated a first input image and a second input image.

FIG. 3 illustrates a stitched image 300 that might be generated by image processor 220 from a first input image 302 and a second input image 304. Note that in this example, there is an area of overlap 306 corresponding to parts of a scene captured in both first input image 302 and second input image 304. Where there is overlap between images, the resulting corresponding pixels of the stitched image might be alpha blended values of the corresponding pixels from each overlapping image.

Figure 4:
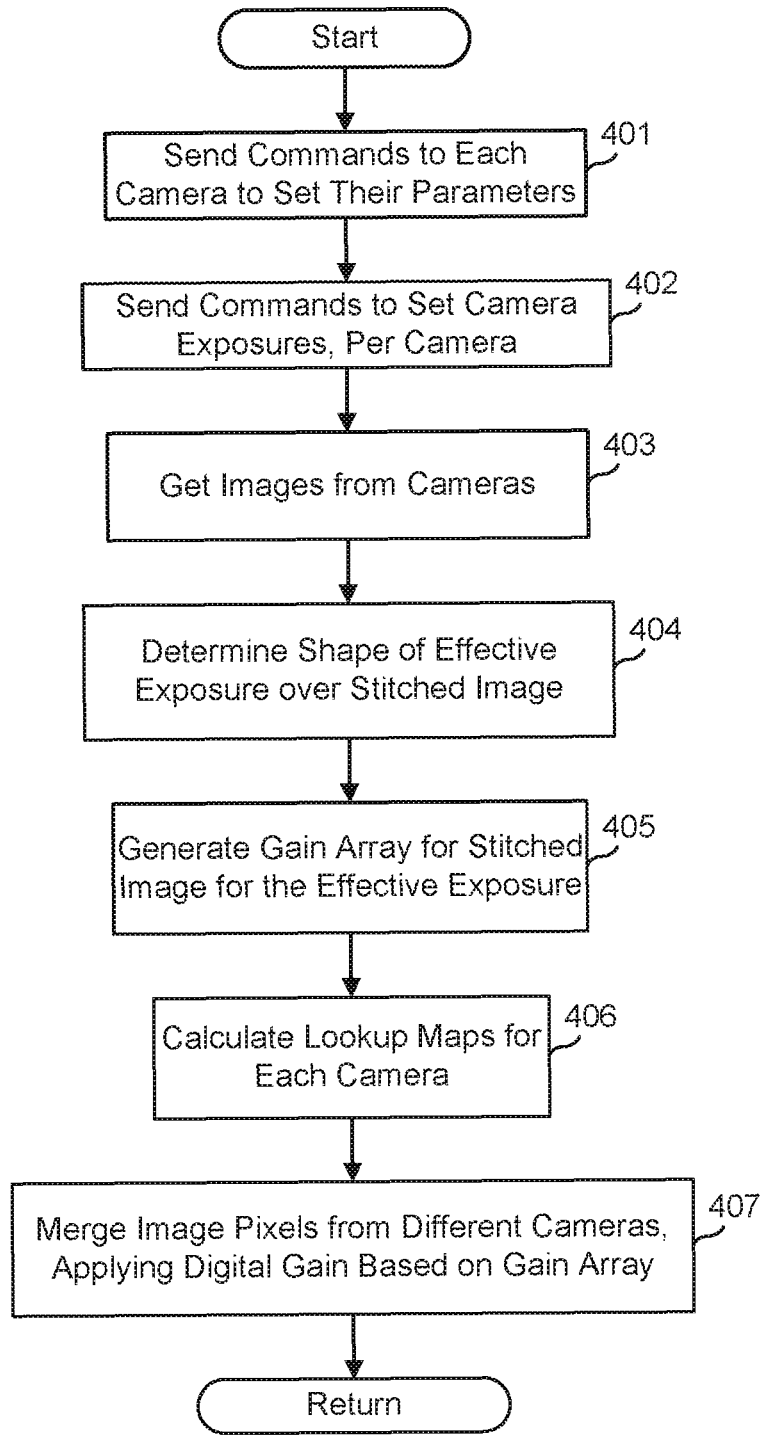
FIG. 4 is a flowchart of a basic set of operations that an image processor might perform to generate a stitched image.

FIG. 4 is a flowchart of a basic set of operations that an image processor might perform to generate a stitched image. In step 401, the image processor sends commands to each camera to set certain parameters. In some situations, these will be the same parameters for each camera, but as explained herein, that requirement can be relaxed. Given two cameras with identical hardware (identical sensor arrays and lenses), and in the absence of parallax and veiling glare, the sensor array pixel values should be the same for two cameras within an overlap region. Where sensor array pixel values are processed in the camera, such as going from raw format to final YUV values suitable for a JPEG codec or a video codec, the camera might compensate for slightly different RGB sensitivity and lens vignetting. The parameters used might be split into those that compensate for the fact that the sensor arrays are different (e.g., black level, lens shading, sensitivity correction, and the like), and those that process the image differently to satisfy some aesthetic constraint (such as different white balance, color correction matrix or gamma, or the like). The former might be left to the camera while the latter taken into account by the image processor.

In step 402, the image processor sends commands to each camera indicating the desired camera exposure for each camera. While these might be different camera exposures, if they are within some close ratio, then less digital gain would be necessary. Too much digital gain can be a problem, such as in that it can cause banding as an artifact of the digital gain amplifying quantization noise. In step 403, the image processor obtains images from the cameras and in step 404, determines the desired shape of the effective exposure to determine the gain required. The gain would be the effective exposure divided by the camera exposure, so it might be different for each camera. The desired shape of the effective exposure might be determined by the overlap, aesthetics, or other considerations. The gain might be represented by an equation, or it might be represented by an array of values that indicates what the digital gain might be for particular pixels. The array might be a two-dimensional array of values, for each pixel or small square of pixels, or the array might be a one-dimensional array of values, specifying a single gain for each column of each camera image, as in the case where two images from two cameras are stitched left-to-right.

In step 405, the image processor generates this gain array, which is additional gain required to reach the desired effective exposure. In step 406, the image processor calculates a lookup table that can transform a YUV pixel to apply the maximum gain value from the gain array. For example, if the spatially varying gain ranged between 1 and 2, the transform would apply a gain of 2.

In step 407, the result of the output of this lookup table and the original pixel are averaged in some proportion that varies with position in the image. This approximates a gain that varies spatially, allowing effective exposure to vary spatially. The proportion varies with position in the image, and could be calculated using a mathematical function or stored in an array.

The lookup table can be used to apply gain in way that is equivalent to a change in exposure, but operates on YUV values. Generally it is preferred not to apply gain directly to YUV values, because of non-linearity and the need to clip the signal in the same way as a longer exposure. To operate on YUV inputs, the lookup table does reflect a process of effectively inverting some stages of image processing, applying gain with the correct clipping, and then reapplying those stages of image processing that were inverted.

This three-dimensional lookup table (from YUV pixel values to YUV pixel values) may be encoded as a graphical processing unit (GPU) texture array for quick processing. The texture array might be a texture map stored in an image file format. Although the lookup table encodes multiple steps (e.g., inversion of some image processing stages, the application of gain and clipping, and the reapplying of those image processing stages), the overall transform is typically smooth and can be accurately represented by a low resolution texture. By implementing the spatially-varying gain for an image as a texture map, various optimized operations of a GPU can be used to speed the processing of the images and the stitching process. This would allow the GPU to perform the conversions represented by the conversion map of YUV values to YUV values where that conversion map varies from pixel to pixel. For example, an image can be an input to a GPU along with a texture array as another input and the GPU can output a resulting image that is the input image with its pixels modified as per the texture array to apply the texture to the image.

Figure 5:
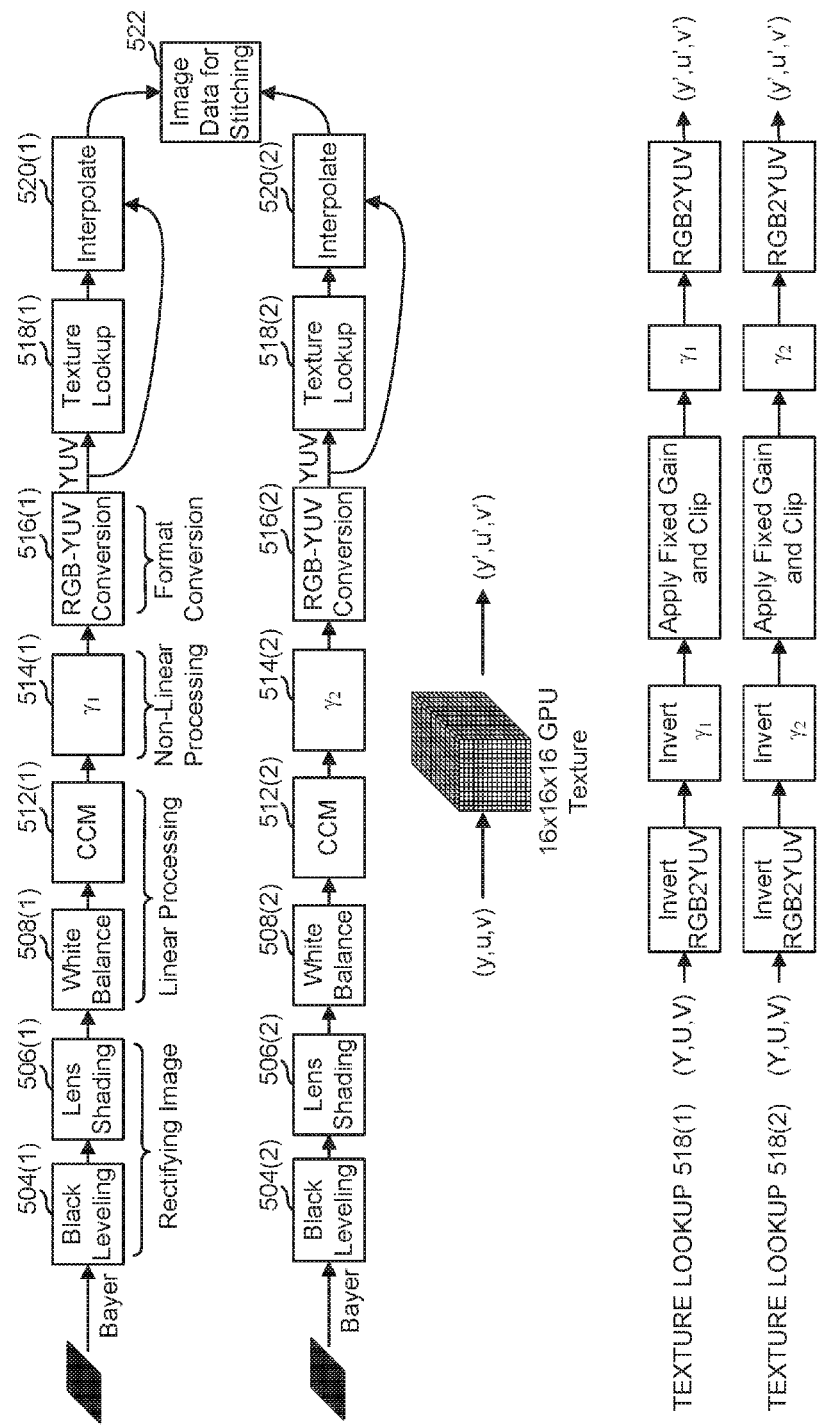
FIG. 5 illustrates an image processing pipeline in which the spatially-varying gain is applied to images being stitched.

FIG. 5 shows an example. Two sensor arrays pixel values each capture an image. The Bayer pixel data (or other color filter array data, if a Bayer filter mosaic is not used) from each sensor array is processed by an image signal processor. The image signal processor may be one image signal processor used twice or two separate image signal processors, and the image signal processor could be software, or, more typically, non-programmable hardware. In any case, two YUV images are produced. Spatially varying gain is applied by interpolating (with a spatially varying proportion) between the YUV image and the result of a GPU texture lookup performed on the YUV image. In this example, a 16×16×16 texture is used to apply gain to YUV values. The texture is computed to convert the YUV signal to RGB, invert gamma, apply gain and clip, reapply gamma, and then convert back to YUV. This is equivalent to applying gain within the image signal processor, before the gamma block.

In the example of FIG. 5, the output of the sensor array feeds to a circuit or software that performs black leveling, and then the output of that has lens shading applied to it, thus rectifying the image. This is illustrated as black leveling 504(1) for the first image and 504(2) for the second image, and lens shading as 506(1) and 506(2). From the lens shading output, white balance processing and color correction matrix (CCM) processing are done (508(1), 508(2), 510(1), 510(2)), followed by non-linear processing, such as 514(1) and 514(2) that apply a gamma correction. Next, a format conversion from the RGB color space to the YUV color space is done (516(1), 516(2)). The texture lookups (518(1), 518(2)) are then performed and interpolation occurs (520(1), 520(2)), resulting in an image 522 suitable for stitching as described herein. The texture lookups can combine the effects of an inversion of a RGB2YUV conversion (a YUV2RGB conversion), a gamma correction inversion, an application of a fixed gain and a clipping (the fixed gain can be different for the two images), reapplication of the gamma correction, and then reapplication of the RGB2YUV conversion. Interpolation might also be done by mixing the original texture lookup input (Y, U, V) with the resulting output of the texture lookup (y', u', v') as a function of (x, y) coordinates of the pixels.

In a variation, the spatially-varying gain represented by the gain array might be applied as lens shading gain, if that is possible in the image processing pipeline. In a further variation, the sensor array may natively support a spatially varying exposure.

In some variations, the texture or the gain array provide for different gamma values over the images. For example, where a left image and a right image are to be stitched and there is a gain difference between the two images, there might be different lookup tables for the left and right halves of each of the left and right images, blended so that stitching seams are not visible. In such cases, the image processor might remove each camera image's gamma and apply the desired gamma that should occur at the seam. An example might be an average of the gammas of the left and right images.

Per-camera global tone mapping, for contrast enhancement and the like, can be used when stitching images with different camera exposures by incorporating that into the texture map. Likewise, other parameters such as white balance can be allowed in different cameras by taking those into account in the lookup arrays.

By having the image processor indicating to cameras what camera exposure to use, problems that occur with excessive digital gain, such as banding, can be avoided. The image processor can consider the image values from the cameras is setting those values, such as by asking for test images, making measurements on those test images, sending commands to set camera parameters, and then obtaining the actual images that are to be used. In the case of video, or repeated still image capture, a prior video frame or prior image capture could be used as the test image.

The image processor can thus take into account an overall total gain on an image-by-image or pixel-by-pixel basis. The total gain on a pixel would be the combined effect of sensor analog gain, gain to due to gamma correction, and the gain introduced as part of the stitching process. Lower gains in some areas might allow for higher gains from other sources. For example, in bright conditions where there is little analog sensor gain, more blending gain might be acceptable. If the image processor determines that there are not many dark pixels in an image, the gamma gain would be lower, so again larger dynamic range is permissible. The image processor can efficiently blend between YUV images that have been processed with different image signal processor parameters, such as different gamma curves.

Figure 6:
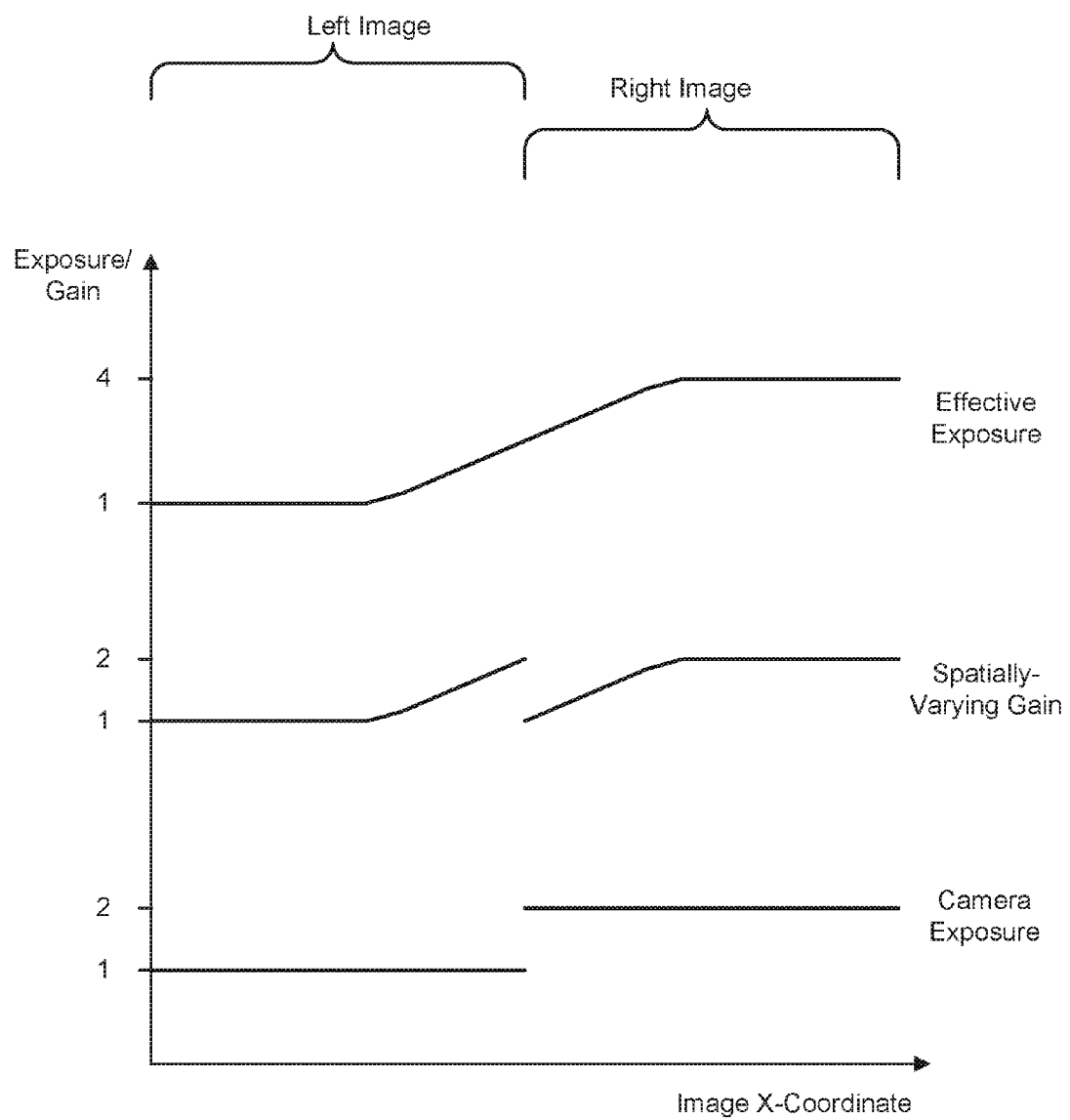
FIG. 6 illustrates an example of spatially-varying gain and effective exposure.

FIG. 6 illustrates an example of spatially-varying gain and effective exposure. In this example, it is assumed that the gain only varies in the X coordinate, which is easier to illustrate, but it can also vary in the Y coordinate. In this example, a left image and a right image that are to be stitched are assumed. The bottom-most set of curves represent the camera exposure. In this example, the camera exposure of the right image is higher than the left image. This might be due to different lighting conditions of the two cameras used to capture these images. In this example, the left image was captured with a camera exposure of 1, whereas the right image was captured with a camera exposure of 2. (Herein, the camera exposures and gains are sometimes referenced in unitless terms to provide simple examples.) If the images were simply placed side-by-side, there would be an expected discontinuity in the merged image and the seam between the two would be apparent.

The middle set of curves represents the spatially-varying gain that varies from left to right over the images. The gain along a vertical line in either image might be constant, but that need not be the case, if there are other operations being performed. In the example of FIG. 6, the spatially-varying gain for the left image is 1 for the leftmost portion of the image, is constant at 1 for a portion, and then rises to 2 at its rightmost portion, which would correspond to where it would be stitched to the right image. The rise can be linear, piecewise linear, or some higher-order variation. In the example, the spatially-varying gain for the right image is 2 for the rightmost portion of the right image, constant at 2 for a portion, and then drops to 1 at its leftmost portion, which would correspond to where it would be stitched to the left image. The drop can be symmetrical to the rise in the spatially-varying gain for the left image, but that might not be the case.

The upper set of curves represents the effective exposure across the images and the merged image. The effective exposure is the product of the spatially-varying gain and the camera exposure. With appropriate selection of the spatially-varying gains, such as those in FIG. 6, the effective exposure is continuous over a stitched image combining the left image and the right image, notwithstanding that the camera exposures are not the same from image to image. In this example, given the camera exposures shown and the spatially-varying gains shown, the effective exposure varies continuously from 1 to 4.

With a smoothed effective exposure, the seam between the images would be much less apparent, which is useful for viewing images and for computer processing of images, such as image recognition. Varying effective exposure at least somewhat continuously spatially provides various benefits, such as having a dynamic range compression (such as that done for high dynamic range (HDR) image capture) vary very smoothly, which may help prevent halo effects.

The effective exposure over a stitched image formed from a combination of the left image and the right image can be determined at each pixel in the stitched image as the spatially-varying gain for the corresponding pixel in the left or right image multiplied by the camera exposure for the camera that took that image. As illustrated in FIG. 6, because of the particular spatially-varying gain used for the left image and the particular spatially-varying gain used for the right image, the effective exposure is continuous over the seam from the combination of the left image and the right image (as well as over the rest of the stitched image). The effective exposure need not be exactly and completely continuous, but it is an at least approximately continuous function over pixels of the stitched image. Note that if the spatially-varying gain were not present, the effective exposure of the stitched image would not be continuous over the seam from the combination of the left image and the right image when the camera exposures are not the same for the two images (or at least different enough to be considered discontinuous).

As with the spatially-varying gains, the effective exposure might be represented by an equation, or it might be represented by an array of values that indicates what the effective exposure might be for particular pixels. The array might be a two-dimensional array of effective exposure values, for each pixel or small square of pixels, or the array might be a one-dimensional array of values, specifying a single effective exposure value for each column of each camera image, as in the case where two images from two cameras are stitched left-to-right.

The effective exposure might be computed from a smoothing of camera exposure values of the two cameras. In one example, the effective exposure might be constant at pixels further from some distance from the seam and then vary linearly with distance from the seam so that the effective exposure value in the example of FIG. 6 at the seam between the left image and the right image is the same effective exposure value or nearly so. The spatially-varying gain for the left image at a given pixel of the left image can then be calculated by dividing the effective exposure at that pixel by the left camera's camera exposure value. Similarly, spatially-varying gain for the right image at a given pixel of the right image can then be calculated by dividing the effective exposure at that pixel by the right camera's camera exposure value. Then, the stitched image can be generated from the left image with the left image's spatially-varying gain applied to it and from the right image with the right image's spatially-varying gain applied to it.

Figure 7:
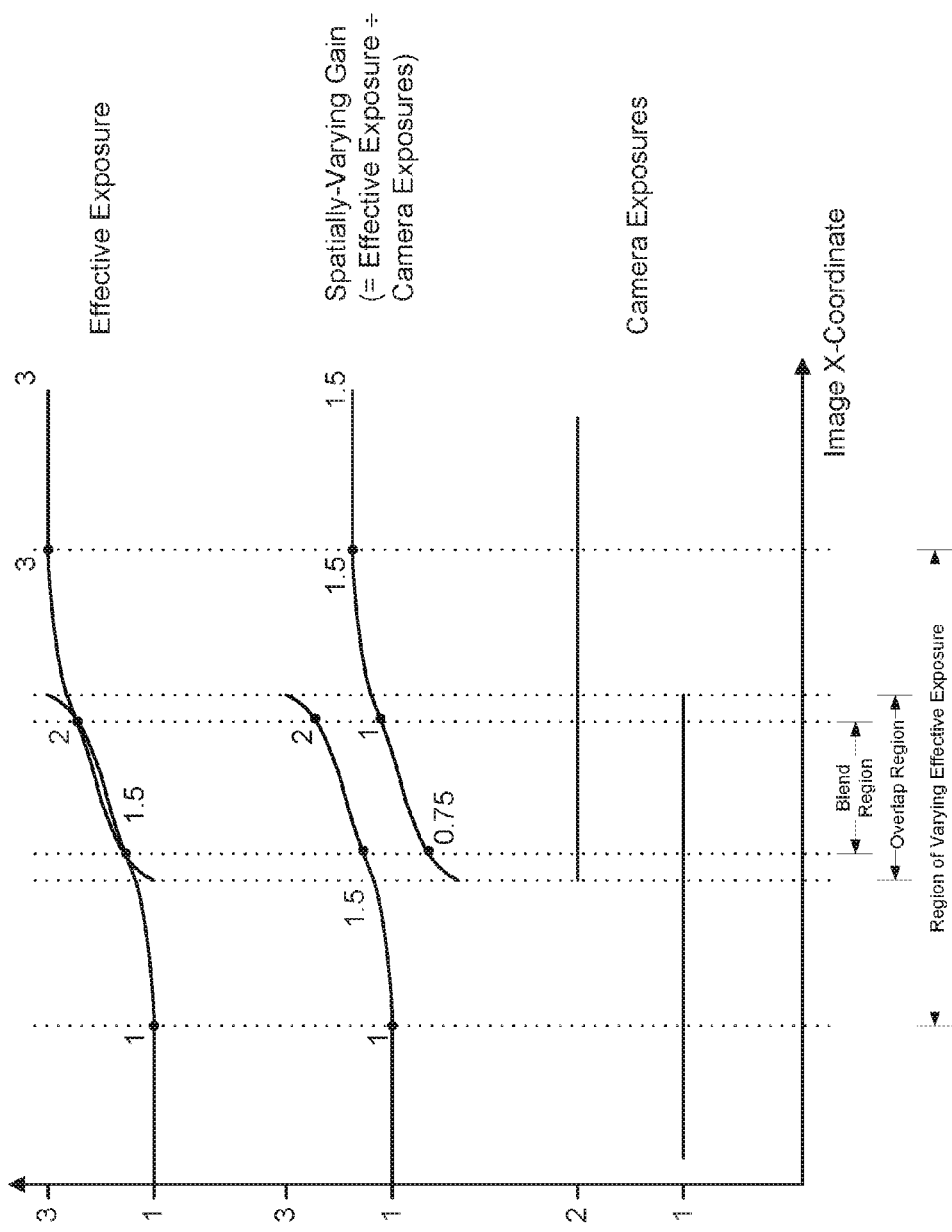
FIG. 7 illustrates another example of spatially-varying gain and effective exposure.

FIG. 7 illustrates another example of spatially-varying gain and effective exposure. In this example, there is some overlap between the left image and the right image, referred to as the overlap region. The bottom-most set of curves represent the camera exposure. The middle set of curves represents the spatially-varying gain that varies from left to right over the images. The upper set of curves represents the effective exposure across the images and the merged image. In contrast with the example of FIG. 6, the spatially-varying gain begins to change further away from the seam, referred to in FIG. 7 as the "region of varying exposure." In the overlap region, pixels from both images are available. In the blend region, differing proportions of the pixels from the left image and from the right image are blended.

As illustrated, not all of the pixels available in the overlap need be used. For example, for the portions of the overlap that are outside the blend region, there are pixels from both images, but only the pixels from one image are used. Thus, the blend region can be the same as the overlap region, but that need not be the case.

In some cases, the effective exposure is exactly equal in both images in the overlap region or blend region, but that need not be the case. In the example of FIG. 7, there is some small difference in the effective exposure between the two images, in the overlap region.

In order for the image processor to determine the best shape for the effective exposure curve, the image processor might gather histogram statistics for sub regions of the left and right images, such as a 4×1 grid of histograms. As the image processor is able to control the cameras, it might also be able to capture more than one image of the same portion of the scene, such as taking one image and then another with a longer exposure to, in effect, provide fractional bit resolution. That can be helpful to reduce banding when gain is applied.

In the above examples, the camera exposure and camera settings might be assumed to be consistent enough that by adjusting the spatially-varying gain over the images, the images will seamlessly stitch together. However, there are cases where images from multi-camera systems have some other non-uniformity that might be visible as a step change on image seams. For example, veiling glare might be noticeable. In a camera image taken of a scene with a bright light source in the field of view, light is scattered in the lens, raising the image levels of the entire frame. This occurs to a slight degree even with indoor lighting—not enough to be noticeable in single camera, but enough to make seams very visible when stitching. In an outdoor scene, with significant veiling glare, the viewer can often just ignore the glare, but where it is stitched to another image that doesn't have the glare, the glare is very noticeable. Other non-uniformities might include static camera differences that are not practical to calibrate out at the camera level.

In order to smoothly stitch images, the image processor can remove some of the veiling glare by applying an offset in its image processing pipeline before gamma is applied. Approaches below describe two complimentary methods for handling both scene-dependent and scene-independent uniformity problems.

Figure 8:
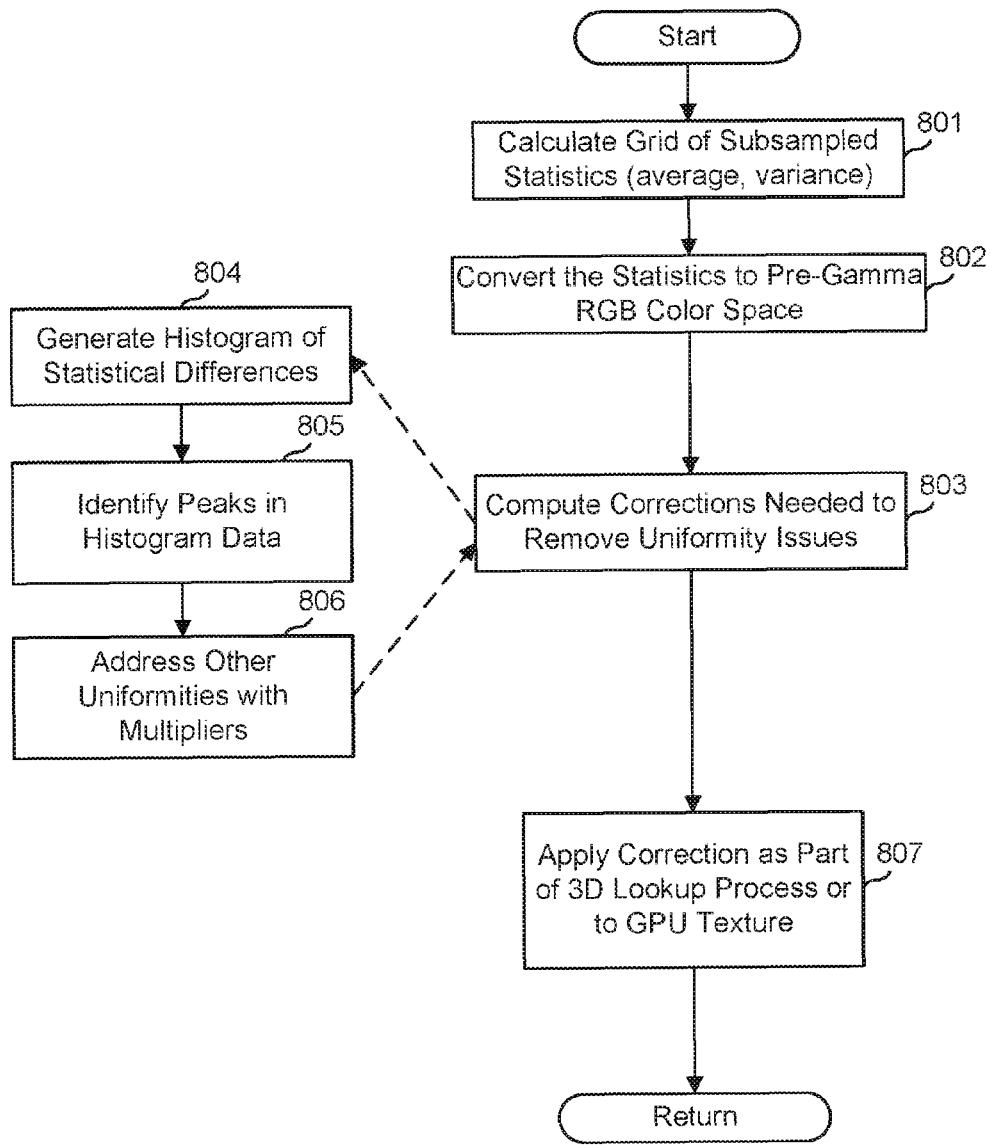
FIG. 8 is a flowchart of one method for handling scene-dependent and scene-independent uniformity problems.

FIG. 8 is a flowchart of one method. This method can be performed by the image processor. In this example, it is assumed there are two images, a left and a right image, but there could be a top image and a bottom image, and/or more than two images.

In step 801, the image processor compiles statistics for both cameras based on images from those cameras and determines the overlap region. For the overlap region, the image processor calculates and stores a grid of subsampled average and variance statistics from both cameras after an alignment is done for the two images. Thus, the subsamples overlap from image to image and for a subsample, the average pixel value (this can be done on a color component by component basis) would be known for the same subsample of the scene for both cameras.

In step 802, the image processor converts those statistics to a pre-gamma RGB color space. This might be done by inverting the ISP processing done on the camera or done in the image processing pipeline. Alternatively, this process can be integrated into the pipeline. This inverts the non-linear image processing that had been performed.

In step 803, the image processor computes the correction needed to remove uniformity issues indicated by the differences in the statistics between the two cameras. The image processor might also maintain a history of these values over time, such as from video frame to video frame, so smooth over time as well as spatially. For a given image pair or video frame pair, the image processor can scan the stored statistics and look for common values, e.g., by building a histogram of differences (step 804) between the average statistics for the two cameras and then identify (step 805) prominent peaks in the histogram data. A consistent veiling glare might show up as a smoothly varying offset on the pixel value in the sensor array, such that the same value is added to each pixel value, irrespective of the pixel brightness. As such, veiling glare often is an RGB offset before gamma correction. The veiling glare offset varies smoothly within each cameras' sensor array and because it is typically a function of the angle of the light, the veiling glare offset in different cameras can be (and indeed often is) very different. However, that can be detected. When veiling glare is detected with high confidence, the image processor can apply an offset and remove that offset from the statistics.

Any remaining differences might relate to sensitivity differences or imperfect vignetting/color shading correction, which the image processor can handle together. In one approach, the image processor accumulates pre-gamma RGB average statistics over multiple frames to build a persistent model of how the illuminant (approximated by white balance red and blue gains) causes uniformity differences between cameras and generates multipliers (step 806) for the input signal to use in addition to the offsets. After statistics have been corrected for these effects, small residual effect can be measured using, for example, linear regression or random sample consensus (RANSAC). In some configurations, this correction is tightly constrained to only allow small changes, to avoid introducing additional artifacts.

Splitting effects into modelled frame-frame differences, such as the veiling glare's pre-gamma RGB offset, and long-running differences, such as illuminant-dependent sensitivity and vignetting/color shading, together with a general small-scale fixup stage can provide good results and possibly fewer errors than a general per-frame regression. Veiling glare and long-term differences due to vignetting/color shading might vary with position in the overlap region, but they tend to vary with low frequency. This can be addressed by splitting the overlap region into a small number of sections (such a four sections) and estimating the corrections independently for each section. This can be corrected while stitching by using two or more different GPU texture lookups, with different sections seeing different textures, and interpolating between the results.

Over time, the image processor can identify, for each camera, scene-independent sensitivity values, in part by considering differences in image pixel levels for overlapping regions over multiple frames or images. This might be measured using standard test images or images of a scene where portions of the scene overlap two or more cameras and measure this over multiple images.

In step 807, the image processor can apply the corrections as part of a GPU lookup process and/or texture. In this manner, the GPU lookup data, to correct a sensitivity difference between the two cameras, would incorporate an extra digital gain to the less sensitive camera. Similarly, veiling glare correction involves removing an offset from the pre-gamma RGB values.

The use of the GPU lookup allows the correction to vary smoothly spatially, which is helpful where more than two images are to be stitched. The correction is not made in the center of the camera's image but fully applied at the boundary with its neighbors, so different sides of an image would have different corrections, but would be the same at the center of the image.

In a general case, the pixels from the overlap region are analyzed by an image processor to extract some correction offsets, factors, or other types of corrections. The pixels are from first region of the first image and a second region of the second image and correspond to portions of a view of a scene that are visible in both the first region and the second region. If both cameras were exactly in the same place, with all the same settings and characteristics, a pixel value for a position in the first region would be expected to be the same as the pixel value at a corresponding position in the second region that would have captured the same light as the pixel in the first region. Of course, it is not practical to have such a constraint, so there will be differences in pixel values. To provide for good stitching, the image processor might perform an analysis to determine possible causes for the differences in pixel values and correct accordingly. The correction would likely bring together the values of the pixels from the two images.

The analysis can be done on a pixel-by-pixel basis, wherein there are as many data points as there are pixels in the overlap region, or the analysis can be done on sections of the overlap region each having multiple pixels therein, so that there are fewer data points than there are pixels in the overlap region. Preferably, the overlap region is divided into enough sections so that there are not too many artifacts. For example, the coarseness of the sections might be a few hundred sections over the entire overlap region, or even fewer than one hundred sections for the overlap region. For example, suppose the sections are 64×64 pixel sections, and for each section, the image processor might have in memory pixel values for the 64×64 pixels of a first region of the first image and pixel values for the 64×64 pixels of a second region of the second image where those pixels are determined (such as by an alignment routine) to correspond to the same area of a scene.

For each section, the image processor calculates a first average pixel intensity value for the first region and a second average pixel intensity value for the second region, and then assumes that the differences are due to an offset, then determines a correction offset representing a difference between the first average pixel intensity value and the second average pixel intensity value. This correction offset can be applied to one or both of the first spatially-varying gain and the second spatially-varying gain. This correction offset can vary from section to section, but it is a simple matter to include it as part of the spatially-varying gain, because that does not need to be constant over the overlap region. In other cases, instead of an offset, the differences in value are considered to be a multiplicative factor, as might be the case where cameras have differing sensor array sensitivities. The collection of differences can be stored separately and applied separately, but also the region-specific correction offset and a plurality of additional section-specific correction offsets for additional sections of the plurality of sections as texture maps.

Other statistics besides average pixel intensity value might be used instead. The statistics might take into account some assumptions about the underlying physical causes of the differences (e.g., veiling glare, sensitivity), or not. The assumptions might be for no cameras, one camera, or both cameras that are involved in the stitching process (of course, more than two cameras might be used). In any case, the correction should reduce differences in value between the pixels that correspond to the same portions of a scene.

Veiling glare tends to be smoothly varying over a captured image. In the analysis, the image processor might compare pixels within the overlap region, but first it inverts some, or all, of any image processing that was performed on the pixel values since being measured by the sensor array. This could include non-linear processing, such as gamma corrections, so that the signal reverts to a form where veiling glare acts as a smoothly varying offset. The image processor would then attempt to compute a correction value for this offset. This might be via linear regression or random sample consensus (RANSAC). Once the correction offset is determined, a correction transform can be defined and applied either or both of the images to remove the difference in veiling glare between the images. Following the correction, the image processor can reapply the non-linear image processing and other processing that was inverted.

The slope of a linear fit for the correction offset may correspond to a sensitivity difference between the cameras, and this can be corrected for. The sensitivity difference between two sensors depends on fixed physical properties of the cameras, which means it is consistent over time. Thus, a more accurate estimate can be obtained by combining data from multiple frames (time steps). This is different than offsets due to veiling glare, which is wholly scene-dependent and therefore can vary significantly from frame to frame.

While the overlap region might be divided into sections to obtain a data point per section, whether an offset, a factor, or other data point usable to generate a correction, it might be preferred to have continuity from section to section. This can be handled by interpolation used when applying the corrections to avoid discontinuities on the resulting image. This might require that the GPU contain a texture map for each correction unless there is a simple mathematical relationship between the different corrections.

Figure 9:
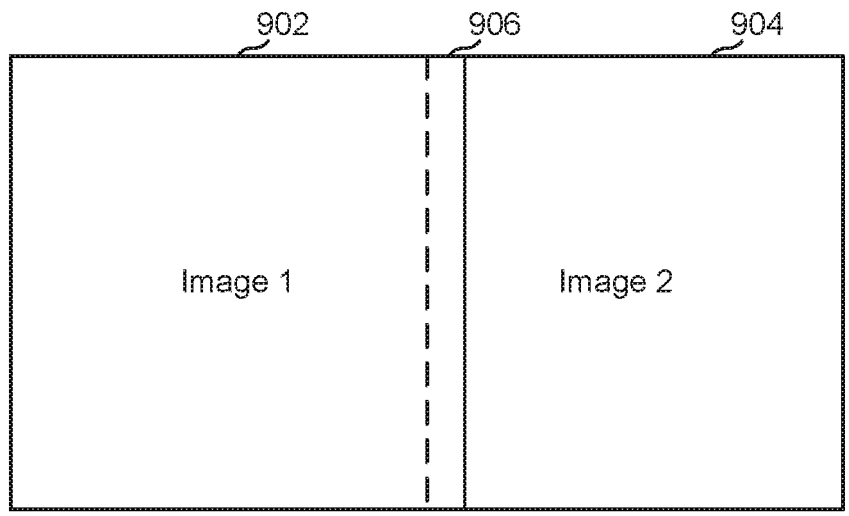
FIG. 9 illustrates stitching of two images as might be done by the image processor.
Figure 9:
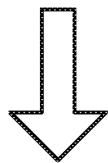
Figure 9:
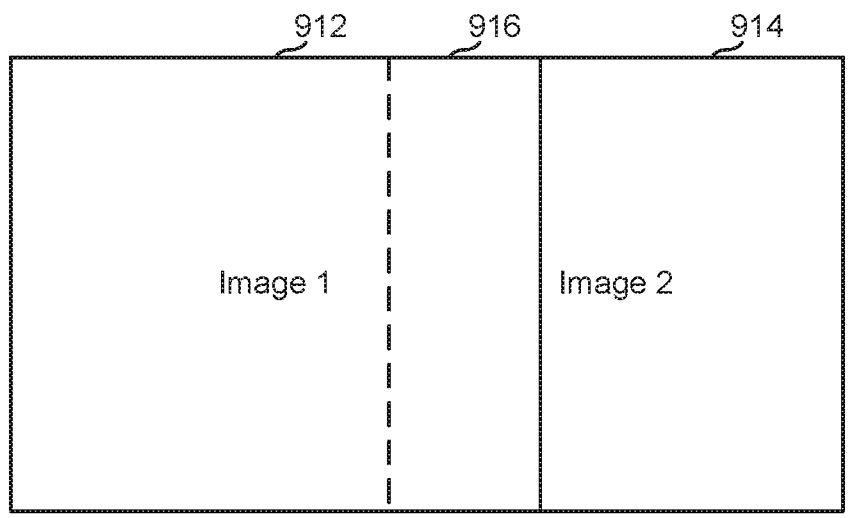

FIG. 9 illustrates stitching of two images as might be done by the image processor. Image 902 on the left and image 904 on the right are processed with a blend region 906 where portions of image 902 and image 904 contain the same portions of the scene. The blend region can be the entire overlap region, but that need not be the case, as portions of the overlap region can be cropped or ignored. Here, it is assumed that image registration, if needed, has already occurred. The images might also be cropped and thus blend region 906 is narrow. Where a narrow blend region still might show uniformity issues, blend width can be increased. In the example shown, the Image 1 and Image 2 are not cropped as much so that the overlap between image data 912 and image data 914 is wider, in blend region 916.

Figure 10:
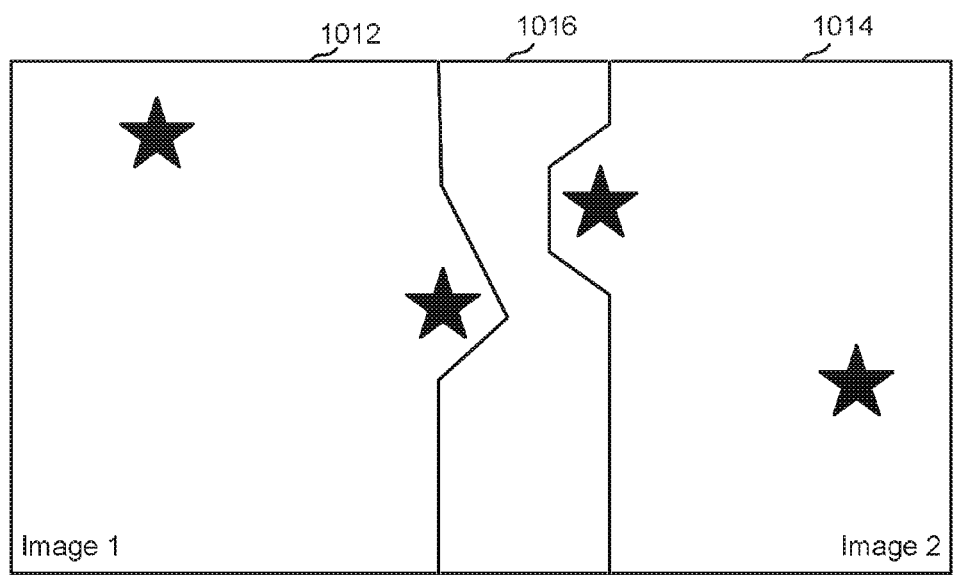
FIG. 10 illustrates varying blend widths.

Increasing the blend width should be reserved to situations where it will not cause other stitching errors (e.g., ghosting) and may be constrained by whether there is a lot of detail in the blend region. Ghosting might occur when images being alpha blended are different enough that features can be distinguished from individual images. Fortunately, situations where a wider blend width is possible typically correspond to situations where uniformity errors are most visible. The blend width can be different at different positions on the seam, as illustrated in FIG. 10, where image 1012 and image 1014 are to be stitched, but a blend region 1016 is irregular to avoid blending at salient features, such as the stars in FIG. 10 that would otherwise be partially covered by a border of the blend region. Salient features might be features that contain considerable detail that would be noticeable in an image. For example, a solid wall of a constant color might not result in any artifacts when intersected by a border of a blend region, but important features and details in an image, such as a face, in the case of a portrait, or other key element of a picture might be somewhat salient to an image.

In one approach to programmatically determine the optimal blend width, the image processor can consider sub-sampled luma average/variance statistics. For each position on the seam, the image processor can attempt to grow the blend width, terminating when the variance statistic from either camera exceeded a threshold or when the average statistics from the two cameras were too far apart. The former implies the image content is not uniform, the latter implies the stitching algorithm has not managed to align the cameras properly. In both cases, using a large blend width would likely introduce ghosting.

Different exposures can provide good dynamic range, but it may not be possible to allow each camera to use its optimal exposure. For example, where a very large digital gain is required to blend between two images, that may introduce quantization artifacts and noise. In some situations, the image processor might need to determine a maximum difference between camera exposures of adjacent cameras (i.e., cameras that will capture images that will be adjacently stitched). The image processor can instruct each camera to get an appropriate camera exposure by controlling the camera exposure factors of exposure time, analog sensor gain, and aperture. In the ideal case, the image processor can get exactly the desired camera exposure on each camera. But when the image processor imposes a maximum difference between camera exposures, the images at those camera exposures are too dark or too saturated, and when dealing with video streams, the same constraints exist and additionally some consistency might be needed from frame to frame.

In general, each camera will have its own exposure selection process, using various inputs. These can be complex. The image processor can instruct the cameras such that they use exposures that meet a first set of constraints that reflect inter-camera constraints, e.g., that the difference in inter-camera relative camera exposure between cameras not be too great) and a second set of constraints that are temporal smoothness constraints, that might constrain a camera from changing its camera exposure too quickly.

Figure 11:
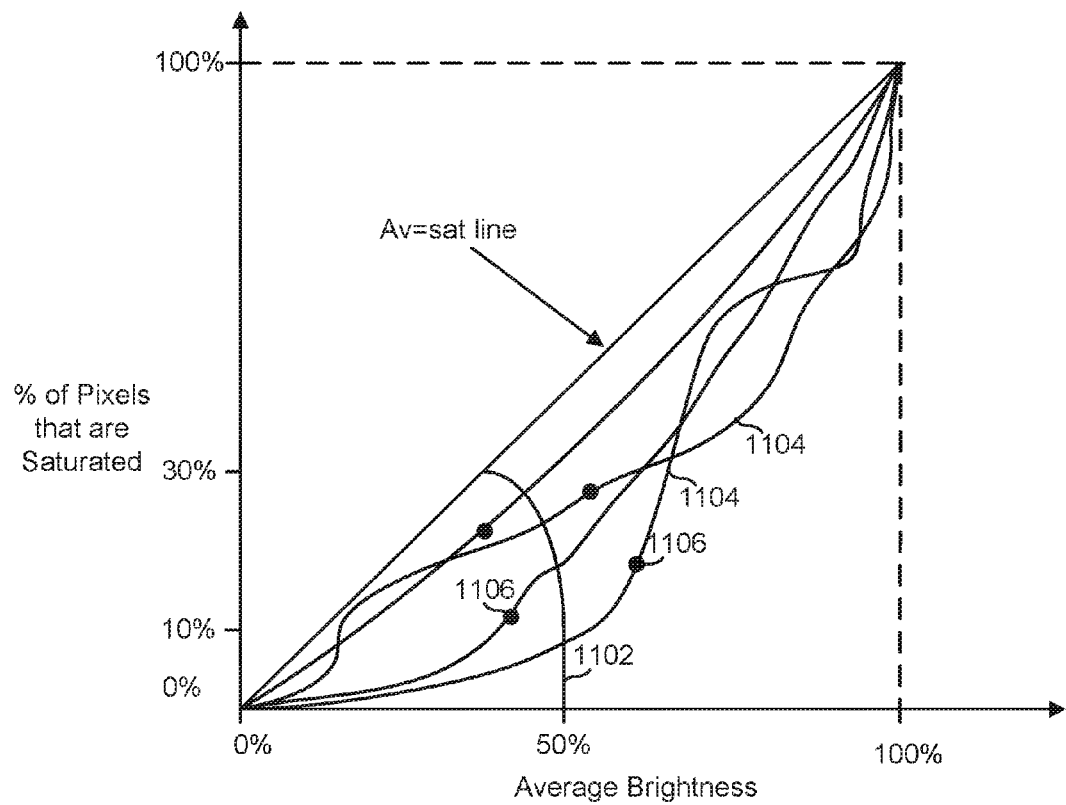
FIG. 11 illustrates such a target curve used in optimizing camera exposures.

To determine the camera exposures to use, the image processor might be programmed to consider a stored target curve on an average brightness (av) versus proportion of saturated pixels (sat). The stored target curve might be represented as a data array wherein the elements of the data array correspond to points on the target curve. FIG. 11 illustrates such a target curve 1102. This target curve roughly represents a target of locus points where the average brightness is 50% unless the proportion of saturated pixels grows too high, in which case the average brightness should drop to avoid too much of the image saturating. In this example, the average brightness of the acceptable solution drops if nearly 10% of the pixels are saturated. FIG. 11 also illustrates the av/sat curves 1104 for the cameras (shown for four cameras) and a current av/sat position 1106 for each camera. Varying the camera exposure of a camera would move the camera's av/sat position up and down the particular av/sat curve for that camera. The shape of the path depends on the scene, i.e., what light is entering the camera.

Since all of the camera av/sat curves intersect curve 1102, there is some camera exposure that would, for each given camera, intersect the target locus. However, the camera exposure should not vary too widely from between adjacent cameras. To determine the appropriate balance, the image processor calculates a cost function. One such cost function is computed as the distance of a camera's average brightness of the image (av) and proportion of saturated pixels (sat) values to the target locus represented by curve 1102. Then, for a multi-camera system, the current cost is the sum of the costs for each camera. In effect, the cost is an error cost.

Other variations of an error cost can be a different per-camera cost that corresponds to how far the values are from the exposure the camera wants to use. It might not be expressed as distance in the (av, sat) plane from some target locus. It could be something more complex, such as a histogram of pixel brightnesses, or the brightness of salient objects, e.g., faces in the image. Once the per-camera cost is defined, they can be combined into the cost for a multi-camera system, and that can be minimized, subject to meeting the set of constraints imposed.

For example, suppose for the current frame or time step, the four cameras represented in FIG. 11 have their average brightness and proportion of saturated pixels values as indicated by the dots on their respective curves. The image processor will attempt to minimize the cost function over all cameras, but following a constraint on the maximum allowed change in exposure. It can do this with a local minimum search, which is easy given those constraints. For example, for each frame, for each camera, the image processor will select among four options: (1) keep the same exposure as the prior frame, (2) set exposure of the camera so that the camera hits the target locus (but subject to a constraint of a maximum step size in the camera exposure in one frame or time step), (3) increase exposure by the maximum allowed step size, or (4) decrease exposure by the maximum allowed step size.

For an N-camera system, this produces $4^N$ possibilities, which is not computationally expensive to check. Using histogram statistics manipulations simplifies this task and thus it is possible to estimate the cost of each possibility and select the one that minimizes total cost with a small amount of computational effort. If N were large, a hierarchical approach could be used by assigning cameras into groups based on adjacency, thus reducing the overall search space.

An additional constraint as to the maximum inter-camera gain might be considered as well. For example, the image processor might consider all $4^N$ options. For example, in the case of four cameras, the exposure of one camera can be allowed to freely vary, while cameras 2 and 3 are constrained to be within around 50% of the camera exposure of camera 1, and camera 4 is constrained be within 50% of the camera exposure of camera 2 and camera 3. The image processor would then converge on a local minimum, while maintaining the inter-camera maximum gain constraint and other constraints. One reason for a maximum inter-camera gain is to limit digital gain to avoid creating artifacts such as banding.

As has been explained, a multi-camera system might provide a plurality of images that are to be stitched together to form a stitched image with a larger field of view and preferably, the seams where one image is adjacent to another image are not noticeable. Often, when there are multiple cameras and a wider field of view, there might be more dynamic range in illumination over the stitched image. To deal with this situation, an image process processes the individual images to form a stitched image by applying a spatially-varying gain over the individual images. The spatially-varying gain can be in the form of a function of pixel position or as an array of values varying in one or two dimensions. To avoid wide disparities in the digital gain needed to seamlessly stitch adjacent images, the image processor might control the camera exposures of the cameras outputting the individual images, such as by sending commands to alter one or more of the factors that make up camera exposure, such as exposure time, sensor analog gain or aperture.

Between the gain controlled by the camera exposure and the digital gain, the image processor can seamlessly stitch images. Where there are other artifacts, such as veiling glare, the image processor can process images to offset those effects.

Figure 12:
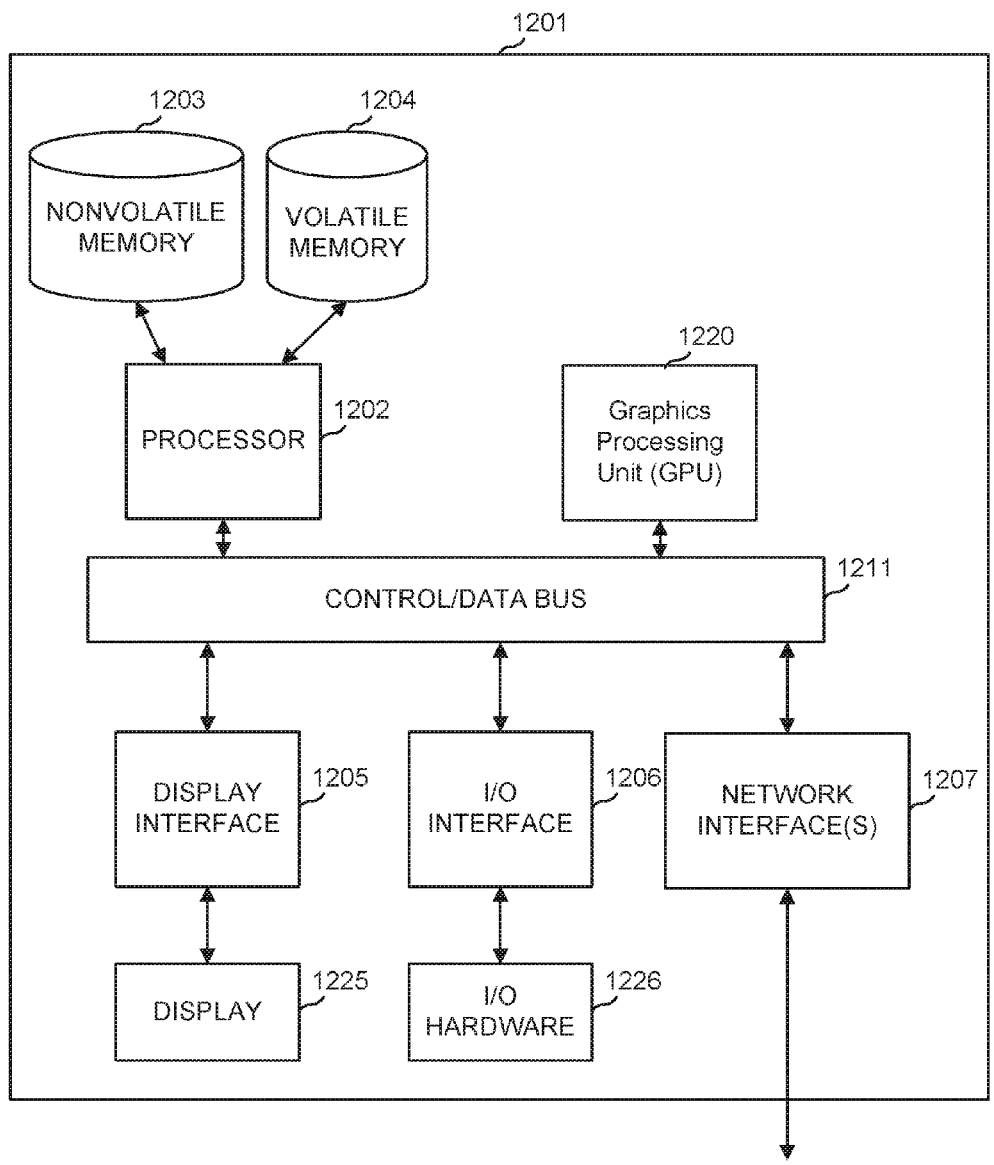
FIG. 12 is a block diagram of an example of computing hardware that might be used.

FIG. 12 is a block diagram of an example of computing hardware that might be present in a camera as described herein and/or an image processor as described herein that controls cameras and/or obtains images from cameras. Computing hardware 1201 in FIG. 12 is shown comprising a processor 1202, non-volatile memory 1203, volatile memory 1204, a display interface 1205, an input/output ("I/O") interface 1206, and network interface(s) 1207. Each of these components can communicate via a control/data bus 1210. Network interface(s) 1207 might include Ethernet, USB, wireless, or other interconnections. Display interface 1205 is coupled to a display 1225 and I/O interface 1206 is coupled to I/O hardware 1226. Other elements, such as power supplies and power connections might be present although not shown. Examples of computing hardware might include embedded devices, desktop computers, or the like and might include other subsystems not shown in FIG. 12. Computing hardware 1201 might also include a GPU 1120 for performing computationally-expensive tasks such as image manipulations.

Processor 1202 may be configured to access memory and execute computer-executable instructions loaded therein. For example, the processor 1202 may be configured to execute computer-executable instructions of various program modules to cause or facilitate various operations to be performed in accordance with one or more embodiments of this disclosure. Processor 1202 may include any suitable processing unit capable of accepting data as input, processing the input data in accordance with stored computer-executable instructions, and generating output data. Processor 1202 may include any type of suitable processing unit including, but not limited to, a central processing unit, a microprocessor, a Reduced Instruction Set Computer ("RISC") microprocessor, a Complex Instruction Set Computer ("CISC") microprocessor, a microcontroller, an Application Specific Integrated Circuit ("ASIC"), a Field-Programmable Gate Array ("FPGA"), a System-on-a-Chip ("SoC"), a digital signal processor ("DSP"), and so forth. Further, processor 1202 may have any suitable microarchitecture design that includes any number of constituent components such as, for example, registers, multiplexers, arithmetic logic units, cache controllers for controlling read/write operations to cache memory, branch predictors, or the like. The microarchitecture design of processor 1202 may be capable of supporting any of a variety of instruction sets.

Non-volatile memory 1203 may include read-only memory ("ROM"), flash memory, ferroelectric RAM ("FRAM"), various types of unalterable ROM, and/or writeable variants of ROM such as electrically erasable programmable read-only memory ("EEPROM"), and so forth. Non-volatile memory 1203 may include removable storage and/or non-removable storage including, but not limited to, magnetic storage, optical disk storage, and/or tape storage. Non-volatile memory 1203 may provide non-volatile storage of computer-executable instructions and other data. Non-volatile memory 1203, removable and/or non-removable, is an example of computer-readable storage media ("CRSM") as that term is used herein.

Non-volatile memory 1203 may store computer-executable code, instructions, or the like executable by processor 1202 to cause processor 1202 to perform or initiate various operations. Moreover, output data generated as a result of execution of the computer-executable instructions by processor 1202 may be stored in non-volatile memory 1203. Non-volatile memory 1203 may store one or more operating systems ("O/S"), one or more database management systems ("DBMS"), and program modules, applications, or the like. Any of the program modules may include one or more sub-modules.

Volatile memory 1204 may include random access memory ("RAM"), static random access memory ("SRAM"), various types of dynamic random access memory ("DRAM"), and so forth. Volatile memory 1204 may include main memory as well as various forms of cache memory such as instruction cache(s), data cache(s), translation lookaside buffer(s) ("TLBs"), and so forth. Further, cache memory such as a data cache may be a multi-level cache organized as a hierarchy of one or more cache levels (L1, L2, etc.). Volatile memory 1204 is an example of computer-readable storage media ("CRSM") as that term is used herein.

Using at least one network interface or I/O interface, an image processor can connect to a camera and communicate electronically with the camera. Strictly speaking, the interfaces need not include display capability, but often that is useful.

Network interface(s) 1207 might also allow processor 1202 to send and receive data from other networked resources, such as servers, clients, devices, etc. that are able to communicate over cable networks, public networks (e.g., the Internet), private networks (e.g., frame-relay networks), wireless networks, cellular networks, telephone networks (e.g., a public switched telephone network), or any other suitable private or public packet-switched or circuit-switched networks. In addition, network interface(s) 1207 might be used for communication using associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial ("HFC") medium, a microwave medium, a radio frequency communication medium, a satellite communication medium, or any combination thereof.

Control/data bus 1210 may include at least one of a system bus, a memory bus, an address bus, or a message bus, and may permit exchange of information between various components of the computing hardware 1201. Control/data bus 1210 may include, without limitation, a memory bus or a memory controller, a peripheral bus, an accelerated graphics port, and so forth. Control/data bus 1210 may be associated with any suitable bus architecture including, without limitation, an Industry Standard Architecture ("ISA"), a Micro Type Architecture ("MCA"), an Enhanced ISA ("EISA"), a Video Electronics Standards Association ("VESA") architecture, an Accelerated Graphics Port ("AGP") architecture, a Peripheral Component Interconnects ("PCI") architecture, a PCI-Express architecture, a Universal Serial Bus ("USB") architecture, and so forth.

Figure 13:
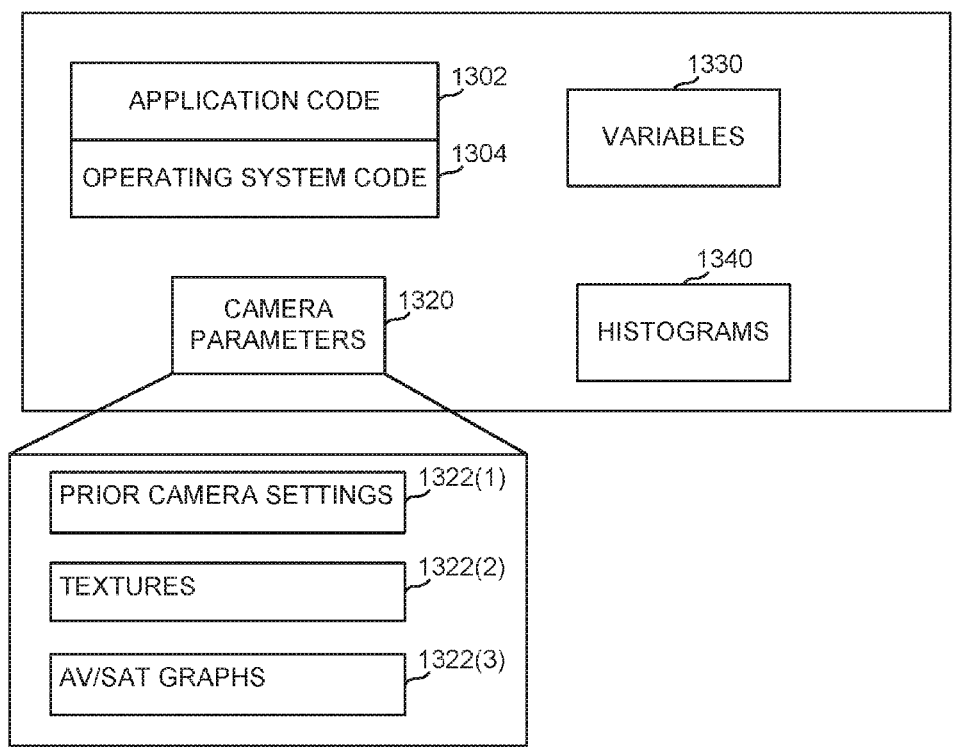
FIG. 13 is a block diagram of an example of non-volatile memory structures as might be used in an image processor to implement functions described herein.

FIG. 13 is a block diagram of an example of non-volatile memory structures as might be used in an image processor to implement functions described herein. The memory structures include storage for application code 1302, operating system code 1304, a camera parameters data structure 1320, storage 1330 for variables, and storage 1340 for histograms. In this example, the non-volatile memory structures for camera parameters data comprise prior camera settings 1322(1), textures 1322(2), and av/sat graphs 1322(3) such as camera av/sat curves and a target av/sat curve.

The various embodiments further can be implemented in a wide variety of operating environments, which in some cases can include one or more user computers, computing devices or processing devices that can be used to operate any of a number of applications. Such a system also can include a number of workstations running any of a variety of commercially available operating systems and other known applications. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of processing images comprising:
    determining, for a first camera of a plurality of cameras, a first camera exposure value;
    determining, for a second camera of the plurality of cameras, a second camera exposure value, wherein the second camera exposure value is different from the first camera exposure value;
    communicating the first camera exposure value to the first camera;
    communicating the second camera exposure value to the second camera;
    obtaining a first image from the first camera;
    obtaining a second image from the second camera;
    determining an array of effective exposure values for a stitched image stitched from the first image and the second image, wherein an array of effective exposure values corresponds to an effective exposure that varies over pixels of the stitched image and is an at least approximately continuous function over pixels of the stitched image;
    determining a first spatially-varying gain for the first image, wherein the first spatially-varying gain is a function of the effective exposure divided by the first camera exposure value, wherein the first spatially-varying gain varies over pixels of the first image;
    determining a second spatially-varying gain for the second image, wherein the second spatially-varying gain is a function of the effective exposure divided by the second camera exposure value, wherein the second spatially-varying gain varies over pixels of the second image;
    generating a modified first image by applying the first spatially-varying gain to the first image, wherein applying comprises a pixel-by-pixel multiplication wherein for a given pixel, a value in the first image of the given pixel is multiplied by a value in the first spatially-varying gain for the given pixel;
    generating a modified second image by applying the second spatially-varying gain to the second image, wherein applying comprises a pixel-by-pixel multiplication wherein for a given pixel, a value in the second image of the given pixel is multiplied by a value in the second spatially-varying gain for the given pixel; and
    generating the stitched image from the first modified image and the second modified image.

2. The computer-implemented method of claim 1, wherein communicating the first camera exposure value to the first camera comprises communicating instructions for the first camera to set a first exposure time and a first aperture, and wherein communicating the second camera exposure value to the second camera comprises communicating instructions for the second camera to set a second exposure time and a second aperture.

3. The computer-implemented method of claim 1, further comprising:
   determining an overlap region between the first image and the second image, wherein the overlap region includes a first region of the first image and a second region of the second image and corresponds to portions of a view of a scene that are visible in both the first region and the second region;
   determining a first average pixel intensity value for the first region;
   determining a second average pixel intensity value for the second region;
   determining a correction offset representing a difference between the first average pixel intensity value and the second average pixel intensity value; and
   applying the correction offset to one or both of the first spatially-varying gain and the second spatially-varying gain.

4. An image processing system, comprising:
   an interface coupled to a first camera and a second camera;
   a storage device;
   one or more processors; and
   memory to store computer-executable instructions that, if executed, cause the one or more processors to:
      determine a first camera exposure setting for the first camera;
      determine a second camera exposure setting for the second camera, the second camera exposure setting being different than the first camera exposure setting;
      communicate, over the interface, the first camera exposure setting to the first camera;
      communicate, over the interface, the second camera exposure setting to the second camera;
      obtain a first image from the first camera;
      obtain a second image from the second camera;
      determine an array of effective exposure values for a stitched image stitched from the first image and the second image, wherein the array of effective exposure values corresponds to an effective exposure that varies over pixels of the stitched image;
      determine a first spatially-varying gain for the first image, wherein the first spatially-varying gain is a function of the effective exposure and the first camera exposure setting;
      determine a second spatially-varying gain for the second image, wherein the second spatially-varying gain is a function of the effective exposure and the second camera exposure setting; and
      generate the stitched image from the first image with the first spatially-varying gain applied to the first image and the second image with the second spatially-varying gain applied to the second image.

5. The image processing system of claim 4, wherein the effective exposure is an at least approximately continuous function over pixels of the stitched image, and wherein the memory to store computer-executable instructions further comprises computer-executable instructions that, if executed, cause the one or more processors to:
   determine the first spatially-varying gain for the first image by dividing the effective exposure by the first camera exposure setting;
   determine the second spatially-varying gain for the second image by dividing the effective exposure by the second camera exposure setting;
   determine if the first camera exposure setting and the second camera exposure setting are equal; and
   when the first camera exposure setting and the second camera exposure value are setting, generate the stitched image from the first image without the first spatially-varying gain applied to the first image and from the second image without the second spatially-varying gain applied to the second image.

6. The image processing system of claim 4, further comprising:
   a graphics processing unit;
   memory storage for data structures representing texture maps; and
   wherein the memory to store computer-executable instructions further comprises computer-executable instructions that, if executed, cause the one or more processors to:
      store a first texture map corresponding to the first spatially-varying gain into the memory storage for data structures representing texture maps;
      store a second texture map corresponding to the second spatially-varying gain into the memory storage for data structures representing texture maps;
      apply the first spatially-varying gain to the first image by sending a first instruction to the graphics processing unit to perform a texture operation using the first texture map textured onto the first image; and
      apply the second spatially-varying gain to the second image by sending a second instruction to the graphics processing unit to perform a texture operation using the second texture map textured onto the second image.

7. The image processing system of claim 4, wherein the memory to store computer-executable instructions further comprises computer-executable instructions that, if executed, cause the one or more processors to:
   determine an overlap region between the first image and the second image, wherein the overlap region includes a first region of the first image and a second region of the second image and corresponds to portions of a view of a scene that are visible in both the first region and the second region;
   logically divide the overlap region into a plurality of sections, including a given section in the plurality of sections wherein the given section includes a first section-specific region of the first region and a second section-specific region of the second region;
   determine a first statistic value for the first section-specific region;
   determine a second statistic value for the second section-specific region;
   determine a correction representing a difference between the first statistic value and the second statistic value;
   determine, for the given section, a section-specific correction representing differences between a first section-specific statistic value of pixels in the first section-specific region and a second section-specific statistic value in the second section-specific region; and
   apply the section-specific correction to one or both of the first spatially-varying gain and the second spatially-varying gain.

8. The image processing system of claim 7, wherein the memory to store computer-executable instructions further comprises computer-executable instructions that, if executed, cause the one or more processors to:

store the section-specific correction offset and a plurality of additional section-specific correction offsets for additional sections of the plurality of sections as texture maps; and when generating the stitched image, instruct a graphical processing unit to use the texture maps with the first spatially-varying gain and the second spatially-varying gain.

9. The image processing system of claim 7, wherein the first statistic value, the second statistic value, the first section-specific statistic value, and the second section-specific statistic value comprise one or more of average pixel intensity value or variance in pixel intensity value.

10. The image processing system of claim 7, wherein the memory to store computer-executable instructions further comprises computer-executable instructions that, if executed, cause the one or more processors to:

invert non-linear processing on pixel values prior to determining the first statistic value for the first section-specific region and the second statistic value for the second section-specific region; and reapply inverted non-linear processing on the pixel values after applying the section-specific correction.

11. The image processing system of claim 10, wherein the memory to store computer-executable instructions further comprises computer-executable instructions that, if executed, cause the one or more processors to:

determine a linear fit for the section-specific correction in a first time frame and a second linear fit for the section-specific correction in a second time frame different from the first time frame; and interpolate an updated section-specific correction from the linear fit.

12. The image processing system of claim 4, further comprising:

memory storage for a data array representing a target curve of target average brightness versus pixel saturation percentages;

wherein the memory to store computer-executable instructions further comprises computer-executable instructions that, if executed, cause the one or more processors to:

for a plurality of cameras, determine a camera exposure curve of brightness versus pixel saturation percentage for each camera of the plurality of cameras;

determine a first set of constraints on camera exposure values that correspond to inter-camera relative camera exposures;

determine a second set of constraints on camera exposure values that correspond to temporal smoothness constraints;

determine a set of possible changes to the camera exposure values that are within constraints of the first set of constraints and the second set of constraints;

searching the set of possible changes for a lowest cost change, wherein the lowest cost change has a lowest corresponding error cost among the set of possible changes; and communicate to the plurality of cameras, over the interface, individual camera exposure values of the lowest cost change.

13. The image processing system of claim 12, wherein the second set of constraints on camera exposure values comprise a maximum step size for a difference in camera exposure between one frame of a video sequence and a subsequent frame of the video sequence.

14. The image processing system of claim 4, wherein the memory to store computer-executable instructions further comprises computer-executable instructions that, if executed, cause the one or more processors to:

determine first image processing parameters for the first camera;

determine second image processing parameters for the second camera; and account for differences between the first image processing parameters and the second image processing parameters in blending the first image and the second image.

15. The image processing system of claim 4, wherein the memory to store computer-executable instructions further comprises computer-executable instructions that, if executed, cause the one or more processors to:

determine an overlap region of the first image and the second image, wherein the overlap region corresponds to portions of a view of a scene that are visible in both the first image and the second image;

determine a blend region for the stitched image, wherein a pixel of the stitched image that is within the blend region is computed as function of a corresponding pixel in the first image and function of a corresponding pixel in the second image;

determine that the blend region intersects a salient feature in the first image or the second image; and adjust the blend region to account for the salient feature.

16. A non-transitory computer-readable storage medium having stored thereon executable instructions that, as a result of being executed by one or more processors of a computer system, cause the computer system to at least:

communicate with a first camera and a second camera;

determine a first camera exposure setting for the first camera;

determine a second camera exposure setting for the second camera, the second camera exposure setting being different than the first camera exposure setting;

communicate, to the first camera, the first camera exposure setting;

communicate, to the second camera, the second camera exposure setting;

obtain a first image from the first camera;

obtain a second image from the second camera;

determine an array of effective exposure values for a stitched image stitched from the first image and the second image, wherein the array of effective exposure values corresponds to an effective exposure that varies over pixels of the stitched image;

determine a first spatially-varying gain for the first image, wherein the first spatially-varying gain is a function of the effective exposure and the first camera exposure setting;

determine a second spatially-varying gain for the second image, wherein the second spatially-varying gain is a function of the effective exposure and the second camera exposure setting; and generate the stitched image from the first image with the first spatially-varying gain applied to the first image and the second image with the second spatially-varying gain applied to the second image.

17. The non-transitory computer-readable storage medium of claim 16, wherein the executable instructions further comprise instructions that, as a result of being executed by the one or more processors, cause the computer system to:

store a first texture map corresponding to the first spatially-varying gain into a memory storage for data structures representing texture maps;
store a second texture map corresponding to the second spatially-varying gain into the memory storage for data structures representing texture maps;
apply the first spatially-varying gain to the first image by sending a first instruction to a graphics processing unit to perform a texture operation using the first texture map textured onto the first image; and
apply the second spatially-varying gain to the second image by sending a second instruction to the graphics processing unit to perform a texture operation using the second texture map textured onto the second image.

18. The non-transitory computer-readable storage medium of claim 16, wherein the executable instructions further comprise instructions that, as a result of being executed by the one or more processors, cause the computer system to:
determine an overlap region between the first image and the second image, wherein the overlap region includes a first region of the first image and a second region of the second image and corresponds to portions of a view of a scene that are visible in both the first region and the second region;
determine a first average pixel intensity value for the first region;
determine a second average pixel intensity value for the second region;
determine a correction offset representing a difference between the first average pixel intensity value and the second average pixel intensity value; and
apply the correction offset to one or both of the first spatially-varying gain and the second spatially-varying gain.

19. The non-transitory computer-readable storage medium of claim 18, wherein the executable instructions further comprise instructions that, as a result of being executed by the one or more processors, cause the computer system to:
logically divide the overlap region into a plurality of sections, including a given section in the plurality of sections wherein the given section includes a first section-specific region of the first region and a second section-specific region of the second region; and
determine, for the given section, a section-specific correction offset representing a difference between a first section-specific average pixel intensity value of pixels in the first section-specific region and a second section-specific average pixel intensity value in the second section-specific region.

20. The non-transitory computer-readable storage medium of claim 19, wherein the executable instructions further comprise instructions that, as a result of being executed by the one or more processors, cause the computer system to:
store the section-specific correction offset and a plurality of additional section-specific correction offsets for additional sections of the plurality of sections as texture maps; and
when generating the stitched image, instruct a graphical processing unit to use the texture maps with the first spatially-varying gain and the second spatially-varying gain.

21. The non-transitory computer-readable storage medium of claim 16, wherein the executable instructions further comprise instructions that, as a result of being executed by the one or more processors, cause the computer system to:
store a data array representing a target curve of target average brightness versus pixel saturation percentages;
for a plurality of cameras, determine a camera exposure curve of brightness versus pixel saturation percentage for each camera of the plurality of cameras;
determine a first set of constraints on camera exposure values that correspond to inter-camera relative camera exposures;
determine a second set of constraints on camera exposure values that correspond to temporal smoothness constraints;
determine a set of possible changes to the camera exposure values that are within constraints of the first set of constraints and the second set of constraints;
searching the set of possible changes for a lowest cost change, wherein the lowest cost change has a lowest corresponding error cost among the set of possible changes; and
communicate, to the plurality of cameras, individual camera exposure values of the lowest cost change.

22. The non-transitory computer-readable storage medium of claim 21, wherein the second set of constraints on camera exposure values comprise a maximum step size for a difference in camera exposure between one frame of a video sequence and a subsequent frame of the video sequence.

23. The non-transitory computer-readable storage medium of claim 16, wherein the executable instructions further comprise instructions that, as a result of being executed by the one or more processors, cause the computer system to:
determine an overlap region of the first image and the second image, wherein the overlap region corresponds to portions of a view of a scene that are visible in both the first image and the second image;
determine a blend region for the stitched image, wherein a pixel of the stitched image that is within the blend region is computed as function of a corresponding pixel in the first image and function of a corresponding pixel in the second image;
determine that the blend region intersects a salient feature in the first image or the second image; and
adjust the blend region to account for the salient feature.

* * * * *